Patented May 16, 1950

2,508,249

UNITED STATES PATENT OFFICE 2,508,249

ALLYL POLYESTERS OF AMINO ALKYL CARBOXYLIC ACIDS

Clyde E. Gleim, Akron, Ohio, assignor to Wingfoot Corporation, Akron, Ohio, a corporation of Delaware No Drawing. Application July 26, 1947, Serial No. 764,024

6 Claims. (Cl. 260—77.5)

This invention relates to polyesters of the type resulting from the reaction of an allyl ester of an aminoalkylcarboxylic acid and an allyl haloformate, the polyesters having the general formula

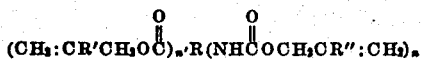

where R is a polyvalent saturated aliphatic hydrocarbon radical, R' and R are hydrogen or a halo such as chloro or methyl radical and $n$ and $n'$ are whole numbers not greater than 2.

It has been discovered that a new composition of matter may be produced when the allyl ester of an aminoalkylcarboxylic acid is reacted with an allyl haloformate, which new composition is characterized by its ability to be polymerized to a resinous mass of hard, clear, glass-like properties.

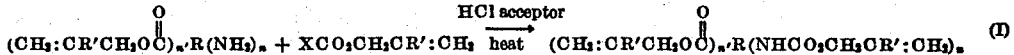

As an example of this invention, 350 parts of allyl chloroformate was added to a mixture of 258 parts of methyl aminoacetate hydrochloride and 425 parts of pyridine at 10° C. When the reaction was completed the resulting mixture was poured into an excess of cold dilute hydrochloric acid and the resulting organic layer separated, washed and dried. Distillation of the organic layer yielded 81 parts of methyl N-carballoxy aminoaceate, B. P. 116–8°/2 mm., $d_{15}^{25}$, 1.1505, $n_D^{24}$, 1.4572

A mixture of 93 parts of methyl N-carballoxy aminoacetate, 150 parts of allyl alcohol and one part of para toluene sulfonic acid was heated at the boiling temperature of the mixture. The methanol formed during the reaction was removed by slow distillation through a condensing column. After the reaction was completed the residual material was distilled and 40 parts of allyl N-carballoxy aminoacetate was obtained, B. P. 126–8°/1 mm., $d_{15}^{25}$, $n_D^{24}$, 1.4653

As another example of this invention, 122 parts of allyl chloroformate was added to a mixture of 115 parts of allyl glycinate and 240 parts of pyridine at 5° C. When the reaction was completed, the resulting mixture was poured into an excess of cold dilute hydrochloric acid and the resulting organic oil separated, washed and dried. Distillation of the organic layer gave allyl N-carballoxy aminoacetate, B. P. 126–8°/1 mm.

Another example of this invention comprises reacting allyl glycinate with phosgene to give C₃H₅OOCCH₂NHCOCl which may be reacted with allyl alcohol in the presence of a hydrogen chloride acceptor to give allyl N-carballoxy aminoacetate.

A quantity of this allyl amine diester, as produced above using allyl aminoacetate hydrochloride, containing 5% benzoyl peroxide was heated for 39 hours at 65° C. to produce an infusible, insoluble resinous mass of clear, glass-like properties and having a Rockwell hardness of M 100 and a specific gravity of 1.277.

The reaction as exemplified above may be expressed in terms of the following general equation:

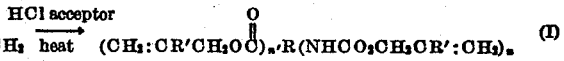

where R is a polyvalent saturated aliphatic hydrocarbon radical, X is a halogen and $n$ and $n'$ are whole numbers not greater than 2. The hydrogen attached to the nitrogen may be substituted by an alkyl monovalent radical or another carbaliphatoxy radical having the general formula

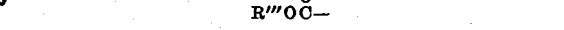

where R''' is a monovalent aliphatic radical.

The reaction of the amino group with the haloformate may be carried out at a temperature from about 10° C. to the reflux temperature of the haloformate with or without an inert solvent. It is preferred to carry out the reaction of the amino group with the haloformate in the presence of a hydrogen chloride acceptor. When the acceptor is used, lower temperatures of +10° C. to −15° C. may be employed and are preferred.

As acceptors that may be used are those basic materials that are either organic or inorganic in nature, such as, for example, pyridine, piperidine, dimethyl aniline and the hydroxides and carbonates of the alkali and alkaline earth metals. It is preferred to carry out the reaction in the absence of water, although water may be present, but when present usually results in a lower yield due to the hydrolysis of the haloformate and of the desired end product.

In the examples shown above, methyl aminoacetate and allyl glycinate was used as a representative member of an ester of an aminoalkylcarboxylic acid to be reacted with an allyl haloformate. However, an allyl aminoalkylcarboxylic acid may be used and thereby eliminate the additional step involving the reaction of the resulting diester with allyl alcohol as shown by the second example. In the preparation of the clear, glass-like resins of this invention, the monomeric diesters are preferred. However, similar monomeric derivatives can be made from the polyamino alkyl monocarboxylic acids, the monoamino alkyl polycarboxylic acids, and the polyamino alkyl polycarboxylic acids.

The starting amino ester having the general formula

which is reacted with the allyl haloformates is prepared by reacting the corresponding aminoalkylcarboxylic acid with an alcohol in the presence of an esterifying agent, for example, sulfuric acid and heat. An example of a monoamino alkylmonocarboxylic acid is glycine which is the preferred acid in the preparation of the preferred starting amino ester. However, any reactive aminoalkylcarboxylic acid may be used. Further examples of the monoamino alkyl monocarboxylic acids are alanine $CH_3CH(NH_2)COOH$ and valine $(CH_3)_2CHCH(NH_2)COOH$. Examples of monoamino alkyldicarboxylic acids that may be used are amino malonic acid $$NH_2CH(COOH)_2$$

aspartic acid $HOOCCH_2CH(NH_2)COOH$ and glutamic acid $HOOCCH_2CH_2CH(NH_2)COOH$.

Examples of diamino alkylmonocarboxylic acids that may be used are lysine $$NH_2(CH_2)_4CH(NH_2)COOH$$

α,β-diamino propionic acid $$CH_2(NH_2)CH(NH_2)COOH$$

and arginine $$NH_2C(NH)NH(CH_2)_3CH(NH_2)COOH$$

Examples of diamino alkyldicarboxylic acids that may be used are cystine $(HOOCCH(NH_2)CH_2S)_2$ and diaminosuccinic acid $$HOOCCH(NH_2)CH(NH)COOH$$

The reaction may be carried out at a temperature of between about 10° C. and the reflux temperature of the formate being used. The starting materials are present preferably in equal molar proportions. However, where more than one amino group is present, a corresponding increase in the molar amount of the formate is to be used where a reaction is desired with each of the amino groups. Generally the reaction takes place on each of the amino groups where more than one is present, directly in accordance with the molar equivalent of the formate present. Thus, where two amino groups are present and one molar equivalent of formate is used, the end product generally contains an unreacted amino group.

The polyesters of the aminoalkylcarboxylic acids of this invention show outstanding properties in their ability to polymerize to a hard, clear, glass-like mass having a Rockwell hardness of M 100 or more and a specific gravity of 1.2 or more. The polyesters of this invention are particularly useful as cross linking agents when added to and polymerized with other copolymerizable monomeric compositions, and particularly the mono-functional polymerizable monomers such as styrene, acrylic acid, the acrylates, acrylonitrile, vinyl chloride, vinylidene chloride, etc.

The following example illustrates the use of the compounds of this invention as a cross-linking agent. A solution of 85 parts of styrene, 15 parts of allyl N-carballoxy aminoacetate and 3 parts of benzoyl peroxide was heated at 60° C. for 22 hours to give an insoluble, infusible cross-linked copolymer.

The polymerization of the diesters of this invention may be carried out at a temperature ranging from about 20° C. to 100° C. for a period of time of about 10 hours to about 100 hours, depending, of course, upon the temperatures used and the presence or absence of a polymerization catalyst. It is preferred, however, to use a polymerization catalyst and those suitable are benzoyl peroxide, hydrogen peroxide, potassium perborate and other oxygen-generating agents. Catalysts may be used in amount between about 1% and 10%, based upon the total weight of the monomers being reacted. The copolymerization reaction is usually carried out under the same conditions as are used in carrying out the polymerization of the polyesters or under the conditions that are ordinarily employed in carrying out the polymerization of the polymerizable monomer being reacted with the polyester.

The polymeric masses produced in accordance with the foregoing description are useful in the molding of any of the many types of articles ordinarily made from hard, clear, resinous masses.

Suitable changes may be made in the details of the process without departing from the spirit or scope of the present invention, the limitations of which are defined in the appended claims.

I claim:

1. A compound corresponding to the following structural formula

where R is a polyvalent saturated aliphatic hydrocarbon radical, R' and R'' are radicals from the group consisting of hydrogen, chlorine and methyl, and $n$ and $n'$ are whole numbers from the group consisting of 1 and 2 and where the sum of $n$ and $n'$ equals the valence of R.

2. The compound corresponding to the following structural formula

resulting from the reaction of allyl glycinate and allyl chloroformate.

3. A method of producing a compound corresponding to the following structural formula

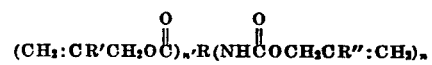

which comprises reacting allyl chloroformate having the structural formula

with allyl ester of an amino alkyl carboxylic acid having the structural formula

in the presence of a hydrogen halide acceptor at a temperature of from −15° C. to the reflux temperature of the formate, and where R is a polyvalent saturated aliphatic hydrocarbon radical, R' and R'' are radicals from the group consisting of hydrogen, chlorine and methyl, and n and n' are whole numbers from the group consisting of 1 and 2, and where the sum of n and n' equals the valence of R.

4. The polymer of a compound corresponding to the following structural formula

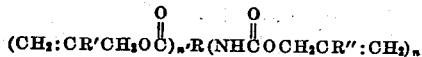

where R is a polyvalent saturated aliphatic hydrocarbon radical, R' and R'' are radicals from the group consisting of hydrogen, chlorine and methyl, and n and n' are whole numbers from the group consisting of 1 and 2 and where the sum of n and n' equals the valence of R.

5. The polymer of the compound corresponding to the following structural formula

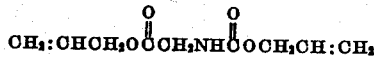

resulting from the reaction of allyl glycinate and allyl chloroformate.

6. The copolymer resulting from reacting 85 parts of styrene with 15 parts of allyl N-carballoxy aminoacetate in the presence of a catalytic amount of benzoyl peroxide at a temperature of 60° C.

CLYDE E. GLEIM.

REFERENCES CITED

The following references are of record in the file of this patent:

UNITED STATES PATENTS

| Number | Name | Date |
|---|---|---|
| 2,385,931 | Muskat et al. | Oct. 2, 1945 |
| 2,390,551 | Muskat et al. | Dec. 11, 1945 |
| 2,395,750 | Muskat et al. | Feb. 26, 1946 |